(12) United States Patent
Desphande

(10) Patent No.: US 8,845,002 B1
(45) Date of Patent: Sep. 30, 2014

(54) FOLDABLE VISOR ASSEMBLY

(71) Applicant: Samir Desphande, Round Rock, TX (US)

(72) Inventor: Samir Desphande, Round Rock, TX (US)

( * ) Notice: Subject to any disclaimer, the term of this patent is extended or adjusted under 35 U.S.C. 154(b) by 0 days.

(21) Appl. No.: 13/954,111

(22) Filed: Jul. 30, 2013

(51) Int. Cl.
*B60J 3/00* (2006.01)
*B60J 3/02* (2006.01)

(52) U.S. Cl.
CPC .................................. *B60J 3/0247* (2013.01)
USPC ........................................ 296/97.7; 296/97.8

(58) Field of Classification Search
USPC .............................................. 296/97.7, 97.8
See application file for complete search history.

(56) References Cited

U.S. PATENT DOCUMENTS

| | | |
|---|---|---|
| 2,747,927 A | 5/1956 | Burkhead |
| 2,927,910 A | 3/1960 | Cooper |
| 3,584,910 A | 6/1971 | Lupul |
| 4,607,875 A * | 8/1986 | McGirr .......................... 296/97.7 |
| 4,944,548 A * | 7/1990 | Payne et al. .................. 296/97.8 |
| D311,716 S | 10/1990 | Widrig |
| 5,064,238 A | 11/1991 | Mohtasham |
| D335,604 S | 5/1993 | Lui et al. |
| 7,992,620 B2 | 8/2011 | Elbs et al. |

* cited by examiner

*Primary Examiner* — Joseph D Pape

(57) ABSTRACT

A foldable visor assembly shields sunlight from a driver and/or passenger's eyes by providing a folding line to adjust a height of the assembly. The assembly includes a flexible panel having a front side, a back side, a top edge, a bottom edge, a first lateral edge, and a second lateral edge. The panel is semitransparent wherein the panel is configured to shield sunlight from passing through the panel. A folding line extends into the panel between the first and second lateral edges. The folding line is pivotable between an extended position and a folded position wherein a height of the panel is selectively adjustable. The folding line is spaced from the top and bottom edges. A plurality of couplers is coupled to the back side of the panel. The couplers are configured for coupling the panel to a windshield of an automotive vehicle.

18 Claims, 5 Drawing Sheets

FOLDABLE VISOR ASSEMBLY

BACKGROUND OF THE DISCLOSURE

Field of the Disclosure

The disclosure relates to visor assemblies and more particularly pertains to a new visor assembly for shielding sunlight from a driver and/or passenger's eyes by providing a folding line to adjust a height of the assembly.

SUMMARY OF THE DISCLOSURE

An embodiment of the disclosure meets the needs presented above by generally comprising a panel having a front side, a back side, a top edge, a bottom edge, a first lateral edge, and a second lateral edge. The panel is semitransparent wherein the panel is configured to shield sunlight from passing through the panel. The panel is comprised of a flexible material. A folding line extends into the panel between the first lateral edge and the second lateral edge. The folding line is pivotable between an extended position and a folded position wherein a height of the panel is selectively adjustable. The folding line is spaced from the top edge and the bottom edge. A plurality of couplers is coupled to the back side of the panel. The couplers are configured for coupling the panel to a windshield of an automotive vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
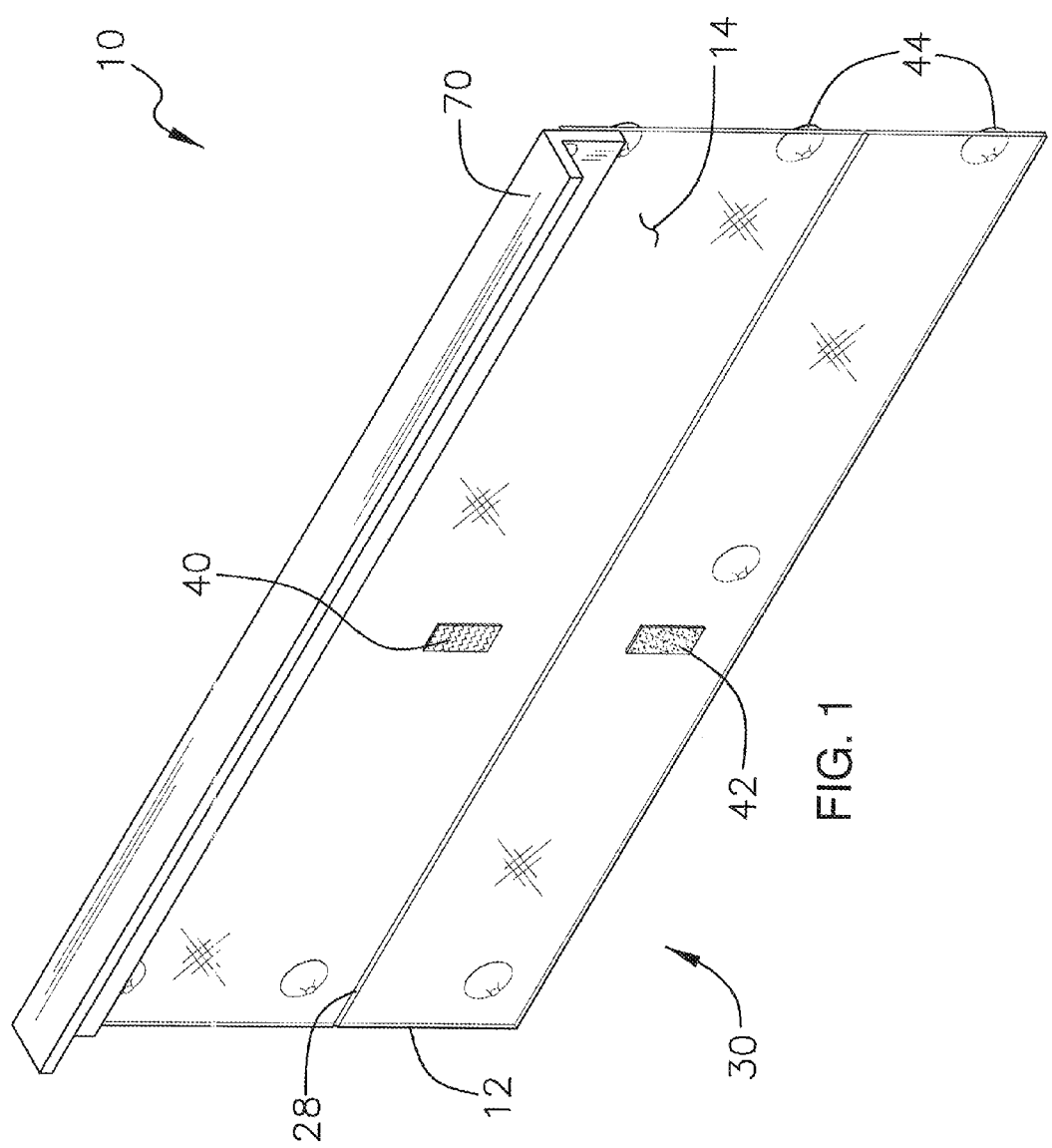
FIG. 1 is a top front side perspective view of a foldable visor assembly according to an embodiment of the disclosure.
Figure 2:
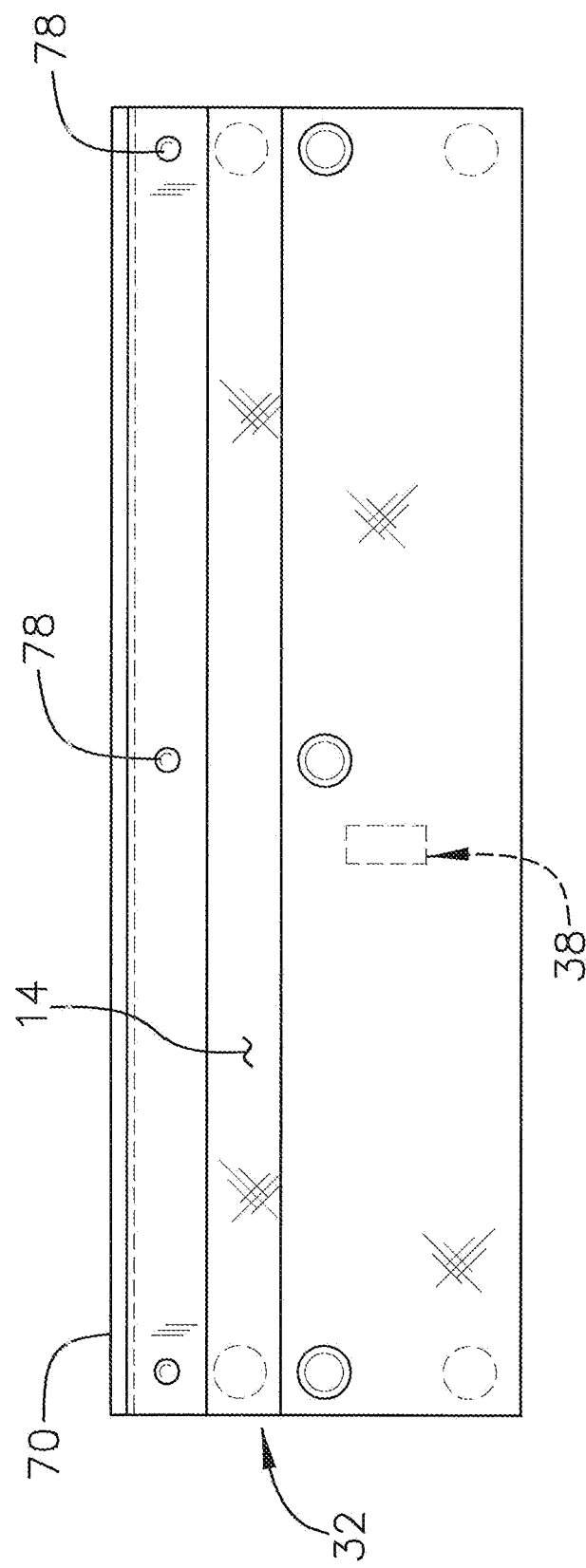
FIG. 2 is a front view of an embodiment of the disclosure in the folded position.
Figure 3:
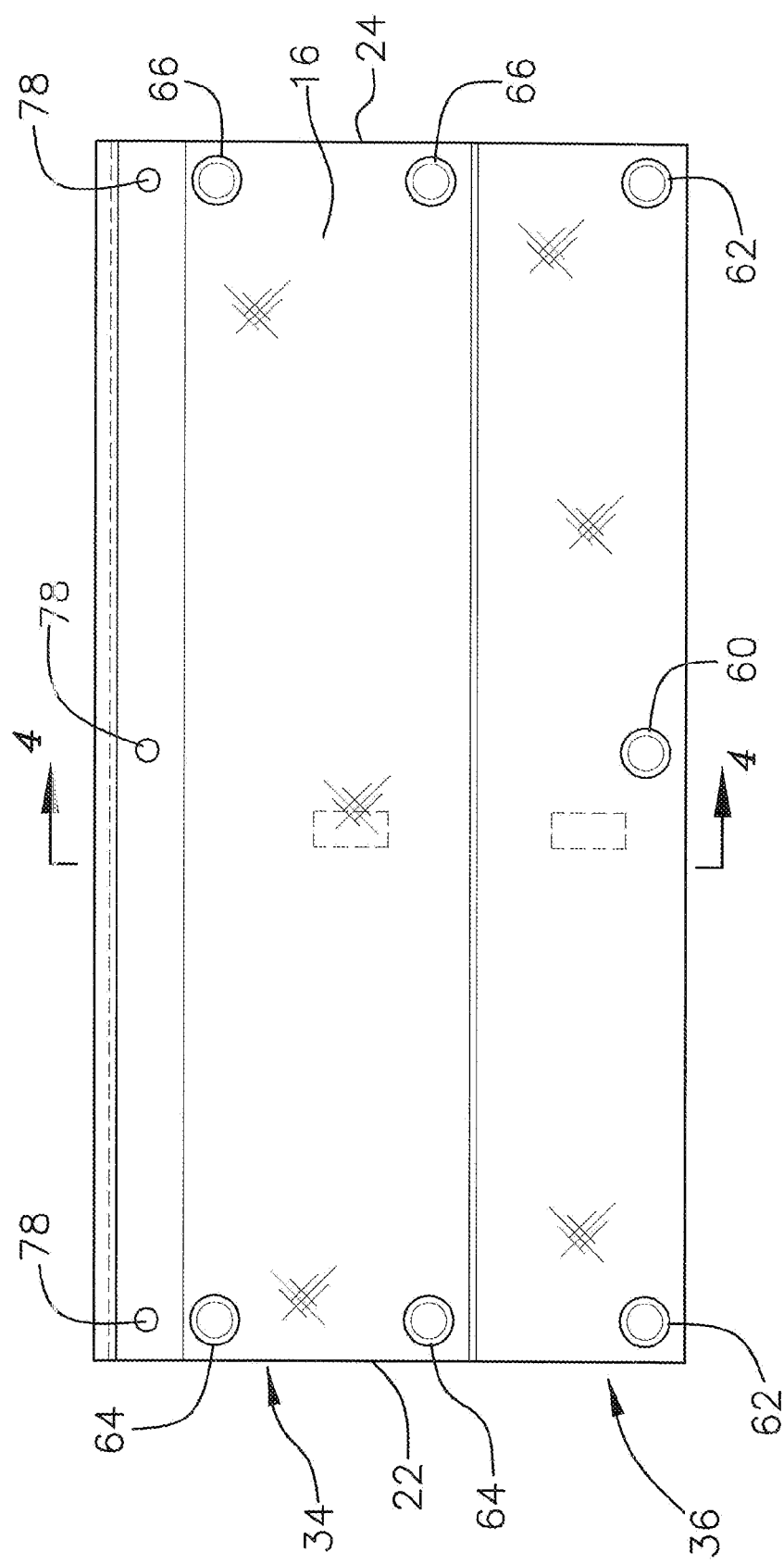
FIG. 3 is a back view of an embodiment of the disclosure in the extended position.
Figure 4:
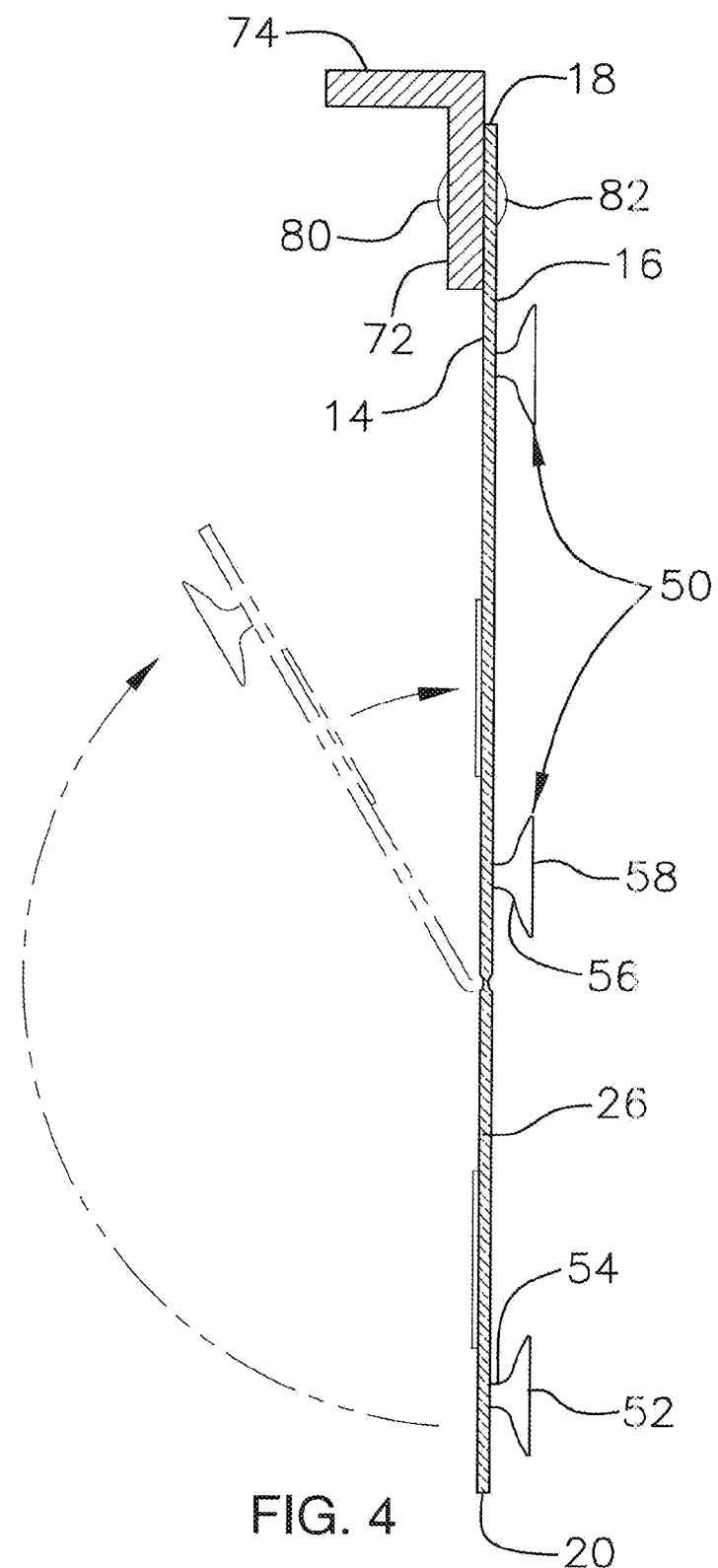
FIG. 4 is a cross-sectional view of an embodiment of the disclosure taken along line 4-4 of FIG. 1.
Figure 5:
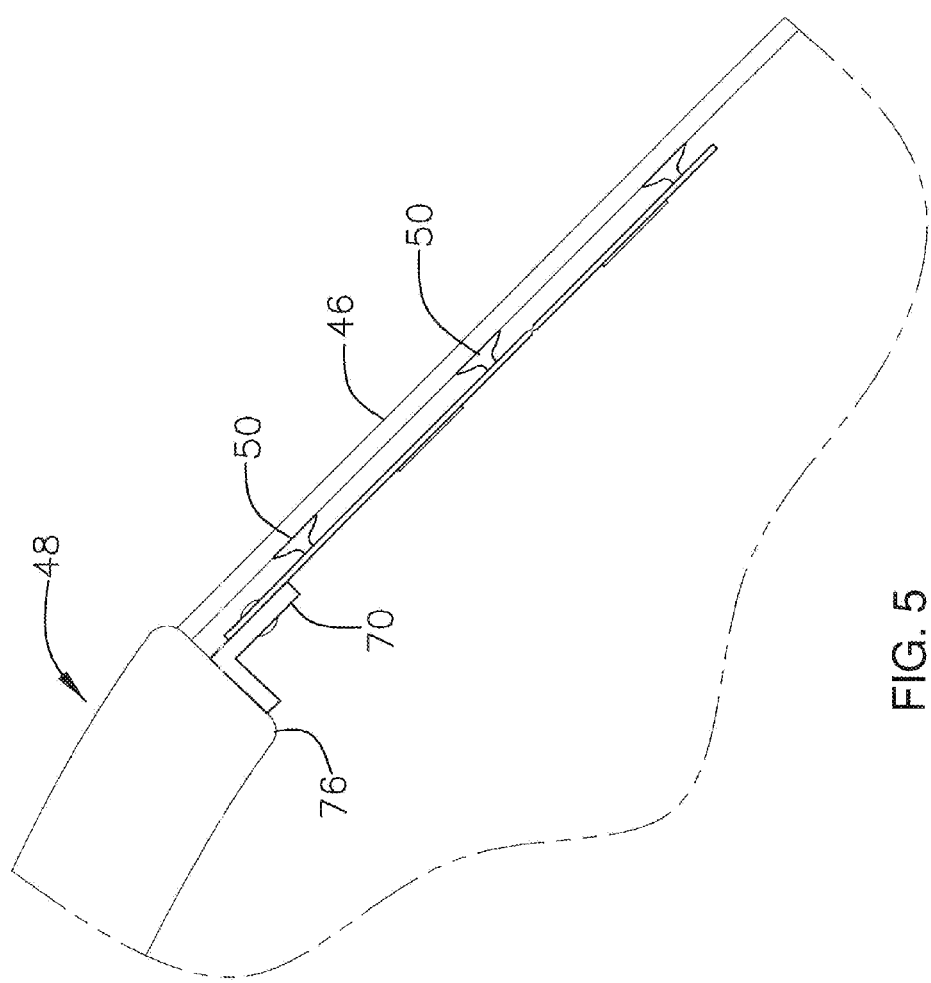
FIG. 5 is a side view of an embodiment of the disclosure in use.

With reference now to the drawings, and in particular to FIGS. 1 through 5 thereof, a new visor assembly embodying the principles and concepts of an embodiment of the disclosure and generally designated by the reference numeral 10 will be described.

As best illustrated in FIGS. 1 through 5, the foldable visor assembly 10 generally comprises a panel 12 having a front side 14, a back side 16, a top edge 18, a bottom edge 20, a first lateral edge 22, and a second lateral edge 24. The panel 12 is semitransparent wherein the panel 12 is configured to shield sunlight from passing through the panel 12. The panel 12 is comprised of a flexible material, such as cloth 26 or the like. The panel 12 is preferably rectangular and may have a height between approximately 18 centimeters and 26 centimeters and a length between approximately 50 centimeters and 56 centimeters.

A folding line 28 extends into the panel 12. The folding line 28 extends between the first lateral edge 22 and the second lateral edge 24. The folding line 28 is pivotable between an extended position 30 and a folded position 32 wherein a height of the panel 12 is selectively adjustable. The folding line 28 is spaced from the top edge 18 and the bottom edge 20. The folding line 28 may be positioned nearer the bottom edge 20 than the top edge 18. The folding line 28 defines an upper portion 34 and a lower portion 36 of the panel 12.

A connector 38 is coupled to the front side 14 of the panel 12. The connector 38 comprises a first connector portion 40 coupled to the upper portion 34 of the panel 12 and a second connector portion 42 coupled to the lower portion 36 of the panel 12. The first 40 and second 42 connector portions are complementary with respect to each other such that the first 40 and second 42 connector portions releasably couple the upper portion 34 and the lower portion 36 when folded along the folding line 28. The first 40 and second 42 connector portions may comprise hook and loop couplers wherein each of the first 40 and second 42 connector portions is preferably an elongated strip extending vertically along a respective one of the upper 34 and lower 36 portions of the panel 12. The first 40 and second 42 connector portions are vertically aligned.

A plurality of couplers 44 is coupled to the back side 16 of the panel 12. The couplers 44 are configured for coupling the panel 12 to a windshield 46 of an automotive vehicle 48. The panel 12 may be positioned in front of a driver and/or passenger's seat. In this manner, the panel 12 blocks sunlight from passing through the panel 12 such that the eyes of either or both the driver and passenger's eyes are shielded from sunlight glare. The couplers 44 preferably comprise suction cups 50 configured to crate suction when the suction cups 50 are pressed against the windshield 46. Each of the suction cups 50 has a working face 52 coupled to an extension 54. The extension 54 couples the working face 52 to the panel 12. An upper portion 56 of the working face 52 tapers downwardly toward a bottom portion 58 of the working face 52. The couplers 44 on the lower portion 36 of the panel 12 may comprise a central coupler 60 horizontally aligned with and equally spaced from a pair of outer couplers 62. Each of the central coupler 60 and the outer couplers 62 may be positioned proximate the bottom edge 20 of the panel 12. The central coupler 60 is preferably positioned proximate the second connector portion 42. The outer couplers 62 may be positioned proximate a respective one of the first lateral edge 22 and the second lateral edge 24. The couplers 44 on the upper portion 34 of the panel 12 may comprise a pair of first couplers 64 and a pair of second couplers 66. The first couplers 64 are vertically aligned and preferably positioned proximate the first lateral edge 22. The second couplers 66 are vertically aligned and preferably positioned proximate the second lateral edge 24. Each of the first couplers 64 and the second couplers 66 may be vertically aligned with one of the outer couplers 62. Alternatively, only five couplers 44 may be used such that there is only one first coupler 64 and one second coupler 66 or only six couplers 44 may be used such that there is no central coupler 60.

A plurality of holes may be positioned in the panel 12. A hook extends away from each of the extensions 54. The hooks taper inwardly away from each of an associated one of the working faces 52. A grommet is positioned in each of the holes wherein the grommets are configured to provide a rigid base into which the hooks are received. Each of the grommets may be molded into or otherwise coupled to an associated one of the holes.

A bracket 70 is coupled to the panel 12. The bracket 70 is preferably L-shaped and has a first section 72 and a second section 74. The first section 72 is coupled to the front side 14 of the panel 12 and the second section 74 extends outwardly from the first section 72 and away from the panel 12. The second section 74 may be positioned above the top edge 18 of the panel 12 and is configured to abut an interior ceiling 76 of the automotive vehicle 48. A plurality of fasteners 78 may removably couple the bracket 70 and the panel 12. Each of the fasteners 78 extends through the bracket 70 and the panel 12 wherein a first end 80 of each of the fasteners 78 extends outwardly of the first section 72 of the bracket 70 and a second end 82 of each of the fasteners 78 extends outwardly of the back side 16 of the panel 12. The fasteners 78 may comprise conventional screws.

In use, as stated above and shown in the Figures, the suction cups 50 are mounted to the windshield 46 of an automotive vehicle 48 in front of either or both of the driver and passenger seats. The lower portion 36 is folded along folding line 28 toward the upper portion 34 and secured using connector 38. In this manner, a height of the assembly 10 is adjustable to provide adequate shading against sunlight for drivers of various heights. The first 40 and second 42 connector portions are disengaged to transition from the folded position 32 to the extended position 30. The suction cups 50 are removed from the windshield 46 in order to store and/or transport the assembly 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable visor assembly configured for attachment to a windshield of an automotive vehicle, said assembly comprising:

a panel having a front side, a back side, a top edge, a bottom edge, a first lateral edge, and a second lateral edge, said panel being semitransparent wherein said panel is configured to shield sunlight from passing through said panel, said panel being comprised of a flexible material;

a folding line extending into said panel, said folding line extending between first lateral edge and said second lateral edge, said folding line being pivotable between an extended position and a folded position wherein a height of said panel is selectively adjustable, said folding line being spaced from said top edge and said bottom edge;

a plurality of couplers coupled to said back side of said panel, said couplers being configured for coupling said panel to a windshield of an automotive vehicle;

said folding line defining an upper portion and a lower portion of said panel; and a connector coupled to said front side of said panel, said connector comprising a first connector portion coupled to said upper portion of said panel and a second connector portion coupled to said lower portion of said panel, said first and second connector portions being complementary with respect to each other such that said first and second connector portions releasably couple said upper portion and said lower portion when folded along said folding line.

2. The assembly of claim 1, further comprising said panel being rectangular.

3. The assembly of claim 1, further comprising said folding line being positioned nearer said bottom edge than said top edge.

4. The assembly of claim 1, further comprising said first and second connector portions comprising hook and loop couplers.

5. The assembly of claim 4, further comprising each of said first and second connector portions being an elongated strip extending vertically along a respective one of said upper and lower portions of said panel, said first and second connector portions being vertically aligned.

6. The assembly of claim 1, further comprising said couplers comprising suction cups configured to create suction when said suction cups are pressed against the windshield, each of said suction cups having a working face coupled to an extension, said extension coupling said working face to said panel, an upper portion of said working face tapering downwardly toward a bottom portion of said working face.

7. The assembly of claim 1, further comprising said couplers on said lower portion of said panel comprising a central coupler horizontally aligned with and equally spaced from a pair of outer couplers, said central coupler being positioned proximate said second connector portion.

8. The assembly of claim 7, further comprising each of said central coupler and said outer couplers being positioned proximate said bottom edge of said panel.

9. The assembly of claim 7, further comprising said outer couplers being positioned proximate a respective one of said first lateral edge and said second lateral edge.

10. The assembly of claim 1, further comprising said couplers on said upper portion of said panel comprising a pair of first couplers and a pair of second couplers, said first couplers being vertically aligned and positioned proximate said first lateral edge, said second couplers being vertically aligned and positioned proximate said second lateral edge.

11. The assembly of claim 10, further comprising each of said first couplers and said second couplers being vertically aligned with one of a pair of outer couplers positioned on said lower portion of said panel.

12. The assembly of claim 1, further comprising a bracket coupled to said panel.

13. The assembly of claim 12, further comprising said bracket being L-shaped and having a first section and a second section, said first section being coupled to said front side of said panel, said second section extending outwardly from said first section and away from said panel.

14. The assembly of claim 13, further comprising said second section of said bracket being positioned above said top edge of said panel.

15. The assembly of claim 12, further comprising a plurality of fasteners removably coupling said bracket and said panel, each of said fasteners extending through said bracket and said panel wherein a first end of each of said fasteners extends outwardly of said first section of said bracket and a second end of each of said fasteners extends outwardly of said back side of said panel.

16. The assembly of claim 1, further comprising:
said folding line being positioned nearer said bottom edge than said top edge;
said first and second connector portions comprising hook and loop couplers, each of said first and second connector portions being an elongated strip extending vertically along a respective one of said upper and lower portions of said panel, said first and second connector portions being vertically aligned;
said couplers comprising suction cups configured to create suction when said suction cups are pressed against the windshield, each of said suction cups having a working face coupled to an extension, said extension coupling said working face to said panel, an upper portion of said working face tapering downwardly toward a bottom portion of said working face, said couplers on said lower portion of said panel comprising a central coupler horizontally aligned with and equally spaced from a pair of outer couplers, each of said central coupler and said outer couplers being positioned proximate said bottom edge of said panel, said central coupler being positioned proximate said second connector portion, said outer couplers being positioned proximate a respective one of said first lateral edge and said second lateral edge, said couplers on said upper portion of said panel comprising a pair of first couplers and a pair of second couplers, said first couplers being vertically aligned and positioned proximate said first lateral edge, said second couplers being vertically aligned and positioned proximate said second lateral edge, each of said first couplers and said second couplers being vertically aligned with one of said outer couplers;
a bracket coupled to said panel, said bracket being L-shaped and having a first section and a second section, said first section being coupled to said front side of said panel, said second section extending outwardly from said first section and away from said panel, said second section being positioned above said top edge of said panel; and
a plurality of fasteners removably coupling said bracket and said panel, each of said fasteners extending through said bracket and said panel wherein a first end of each of said fasteners extends outwardly of said first section of said bracket and a second end of each of said fasteners extends outwardly of said back side of said panel.

17. A foldable visor assembly configured for attachment to a windshield of an automotive vehicle, said assembly comprising:
a panel having a front side, a back side, a top edge, a bottom edge, a first lateral edge, and a second lateral edge, said panel being semitransparent wherein said panel is configured to shield sunlight from passing through said panel, said panel being comprised of a flexible material;
a folding line extending into said panel, said folding line extending between first lateral edge and said second lateral edge, said folding line being pivotable between an extended position and a folded position wherein a height of said panel is selectively adjustable, said folding line being spaced from said top edge and said bottom edge;
a plurality of couplers coupled to said back side of said panel, said couplers being configured for coupling said panel to a windshield of an automotive vehicle; and
a bracket coupled to said panel, said bracket being L-shaped and having a first section and a second section, said first section being coupled to said front side of said panel, said second section extending outwardly from said first section and away from said panel, said second section of said bracket being positioned above said top edge of said panel.

18. A foldable visor assembly configured for attachment to a windshield of an automotive vehicle, said assembly comprising:
a panel having a front side, a back side, a top edge, a bottom edge, a first lateral edge, and a second lateral edge, said panel being semitransparent wherein said panel is configured to shield sunlight from passing through said panel, said panel being comprised of a flexible material;
a folding line extending into said panel, said folding line extending between first lateral edge and said second lateral edge, said folding line being pivotable between an extended position and a folded position wherein a height of said panel is selectively adjustable, said folding line being spaced from said top edge and said bottom edge;
a plurality of couplers coupled to said back side of said panel, said couplers being configured for coupling said panel to a windshield of an automotive vehicle;
a bracket coupled to said panel; and
a plurality of fasteners removably coupling said bracket and said panel, each of said fasteners extending through said bracket and said panel wherein a first end of each of said fasteners extends outwardly of said first section of said bracket and a second end of each of said fasteners extends outwardly of said back side of said panel.

* * * * *